United States Patent
Bohn et al.

(10) Patent No.: US 8,590,097 B2
(45) Date of Patent: Nov. 26, 2013

(54) WINDSHIELD WIPER DRIVE AND MOTOR VEHICLE HAVING A WINDSHIELD WIPER DRIVE

(75) Inventors: Roland Bohn, Buehl (DE); Mario Huesges, Buehlertal (DE); Orlando Sterns, Karlsruhe (DE)

(73) Assignee: Robert Bosch GmbH, Stuttgart (DE)

( * ) Notice: Subject to any disclaimer, the term of this patent is extended or adjusted under 35 U.S.C. 154(b) by 335 days.

(21) Appl. No.: 12/993,476

(22) PCT Filed: May 6, 2009

(86) PCT No.: PCT/EP2009/055470
§ 371 (c)(1),
(2), (4) Date: Nov. 19, 2010

(87) PCT Pub. No.: WO2009/141228
PCT Pub. Date: Nov. 26, 2009

(65) Prior Publication Data
US 2011/0072608 A1  Mar. 31, 2011

(30) Foreign Application Priority Data
May 21, 2008 (DE) .......................... 10 2008 001 937

(51) Int. Cl.
*B60S 1/06* (2006.01)
*B60S 1/18* (2006.01)

(52) U.S. Cl.
USPC ............. 15/250.31; 15/250.3; 74/18; 74/18.1

(58) Field of Classification Search
USPC ................. 15/250.3, 250.31, 250.34, 250.19, 15/250.001; 74/17.8, 18, 18.1; 277/390, 277/391, 634, 637, 500, 551, 578–579; 296/96.15, 96.17
See application file for complete search history.

(56) References Cited

U.S. PATENT DOCUMENTS

| 2,938,070 | A | * | 5/1960 | Morse ........................... 174/151 |
| 3,790,985 | A | * | 2/1974 | Kessler ....................... 15/250.34 |
| 5,621,942 | A | * | 4/1997 | Eustache et al. ............. 15/250.3 |
| 6,240,593 | B1 | * | 6/2001 | Murata ......................... 15/250.3 |
| 6,557,205 | B2 | * | 5/2003 | Ishikawa .................... 15/250.21 |

FOREIGN PATENT DOCUMENTS

| JP | 62156570 | 10/1987 |
| JP | 2001225726 A | 8/2001 |
| WO | 96/04156 A1 | 2/1995 |

OTHER PUBLICATIONS

PCT/EP2009/055470 International Search Report, Jul. 29, 2009.

* cited by examiner

*Primary Examiner* — Gary Graham
(74) *Attorney, Agent, or Firm* — Michael Best & Friedrich LLP

(57) ABSTRACT

The invention relates to a windshield wiper drive (1), particularly a motor vehicle rear window wiper drive, comprising a housing (2) having an output dome (3) penetrated by a wiper shaft (5) and penetrating a contact disk (15), said dome having an external thread (19) in the region of the free end (18) thereof, onto which a nut (20) is screwed for tightening the contact disk (15), the nut being disposed inside a protective cap (21) penetrated by the wiper shaft (15). The invention provides that the protective cap (21) comprises an elastomer material. The invention further relates to a motor vehicle.

19 Claims, 2 Drawing Sheets

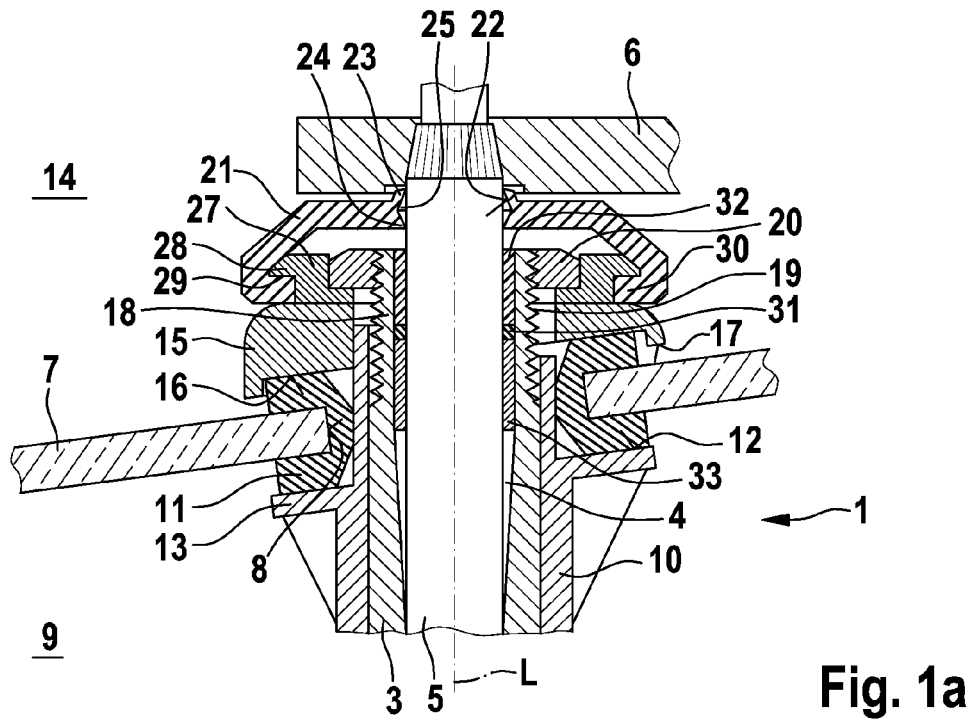
Fig. 1a
Fig. 1b
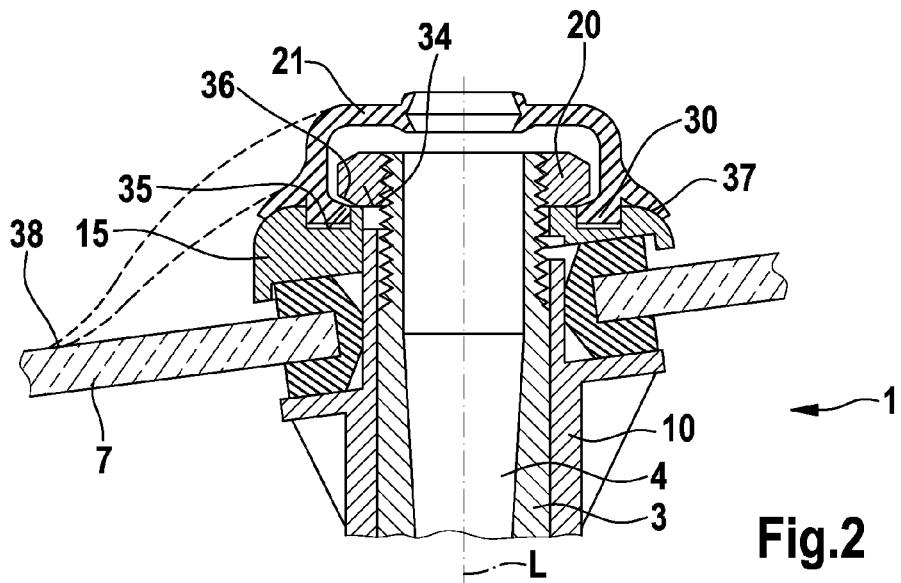
Fig. 2

WINDSHIELD WIPER DRIVE AND MOTOR VEHICLE HAVING A WINDSHIELD WIPER DRIVE

BACKGROUND OF THE INVENTION

The invention relates to a windshield wiper drive, in particular a motor vehicle rear window wiper drive, and to a motor vehicle with a windshield wiper drive.

In known rear window wiper drives, the transmission housing usually has an output dome which penetrates a rear window or the vehicle body, the output dome in turn being penetrated by the wiper shaft. In order to fasten the windshield wiper drive to the rear window or to the vehicle body, there is provided at an end of the output dome an external thread which serves to receive a nut by tightening which the transmission housing can be fastened to the rear window or to the vehicle body. The seal between the wiper shaft and the opening in the output dome is effected by means of an annular seal which is received in a region located radially between the wiper shaft and the internal circumference of the output dome. In order to protect the wiper shaft exit region additionally against direct exposure to water, it is known to fit a protective cap made of a thermoplastic material over the wiper shaft and the nut, the protective cap being fixed relative to the wiper shaft according to a first known variant, and the protective cap being arranged to rotate with the wiper shaft according to a second known variant. A disadvantage of both variants is that water, in particular saline and contaminated water, can penetrate the region enclosed by the protective cap through swirl and therefore, after spending a certain time on the annular seal, will necessarily advance into the interior of the housing. Especially in the case of a fixed protective cap, the latter is unavoidably subjected to wear at the interface with the wiper shaft, necessarily leading to additional leaks over the service life thereof. In the case of a protective cap which rotates with the shaft, the gap between the nut and the protective cap must the selected sufficiently large for the protective cap to be able to rotate relative to the nut without contact, swirled water then being able to penetrate the space enclosed by the protective cap even more easily. Although, in this case, the water can drain from the region within the protective cap comparatively easily, residual substances such a sand, dust, salt, etc., remain in a region below the protective cap after drying, as a result of which the gap becomes ever smaller over the service life, or in some cases is even completely closed. At that time at the latest, the water which has entered cannot drain, or drain completely, and can therefore advance to the annular sealing element between the wiper shaft and the internal circumference of the output dome, leading to premature wear of the sealing element, and consequently to penetration of water into the interior of the housing.

SUMMARY OF THE INVENTION

Technical Objective

It is the object of the invention to propose a windshield wiper drive with which the danger of penetration of water into the interior of the housing is minimized. It is further the object of the invention to propose a motor vehicle having a windshield wiper drive optimized accordingly.

Technical Solution

This object is achieved with the following claims. All combinations comprising at least two of the features disclosed in the description, the claims and/or the figures fall within the scope of the invention.

The invention is based on the concept of configuring the protective cap not as a rigid component, as in the prior art, but as an elastic sealing element made of an elastomeric material, preferably a rubber mixture, so that the protective cap does not have the function of a kind of umbrella, as in the prior art but, instead, can itself co-operate directly in a sealing manner with at least one component of the windshield wiper drive and/or of the motor vehicle adjacent to the protective cap, in order to protect the region below the protective cap optimally against the ingress of water. In this case it is especially preferred if the protective cap, for example as a result of its elastic configuration and/or of a form-fitting arrangement, is loaded with a force in the direction of the at least one adjacent component, in order thereby to optimize the sealing effect. Through the forming of the protective cap from an elastomeric material, the ingress of water into the region below the protective cap can be completely avoided, given an appropriate arrangement of the protective cap, so that penetration of water into a region radially between the wiper shaft and the internal circumference of the output dome is consequently also prevented. This in turn has the result that smaller demands are placed on an annular seal optionally arranged between the output dome and the wiper shaft; optionally, such an annular seal can even be dispensed with. Overall, service life is increased, in comparison to known windshield wiper drives, by the provision of a protective cap made of an elastomeric material.

In developing the invention, it is advantageously provided that the protective cap bears sealingly against the wiper shaft. For this purpose it is preferred if the protective cap, or the opening of the protective cap through which the wiper shaft passes, is (somewhat) stretched as a result of the diameter of the wiper shaft, in order to clamp the wiper shaft and thereby increase the sealing effect.

An optimum sealing effect of the protective cap can be achieved if a grease chamber is formed in a region radially between the protective cap and the wiper shaft. Through the inclusion of a grease cushion radially between the protective cap and the wiper shaft, firstly, friction during operation, and therefore wear, is minimized. Secondly, the sealing effect is further improved on account of the hydrophobic property of grease. In a surprisingly simple manner constructionally, a grease chamber can be implemented in that the protective cap has at least two sealing lips, spaced in the axial direction, which delimit the grease chamber in both axial directions in an axial intermediate region. Expressed differently, through the provision of at least two sealing lips spaced apart in the axial direction and bearing against the wiper shaft, an annular groove, forming a grease chamber, is produced at the edge of the opening of the protective cap through which the wiper shaft passes.

Additionally or alternatively to a sealing contact of the protective cap with the wiper shaft, it is possible to realize an embodiment in which the protective cap bears sealingly, preferably by means of at least one sealing lip formed thereon, against the contact disk, which is loaded with a force by the nut. Additionally or alternatively to the sealing contact of the protective cap with the contact disk, it is possible to realize an embodiment in which the sealing cap bears sealingly against the rear window through which the output dome passes, or against the vehicle body through which the output dome passes, in a motor vehicle equipped with a windshield wiper drive.

Especially advantageous is an embodiment in which the protective cap is held positively in its sealing position against at least one component of the windshield wiper drive in order, firstly, to prevent the sealing cap from being unintentionally pulled from the rest of the windshield wiper drive and, secondly, in order to hold the sealing cap in a defined sealing position.

A possible way of forming a positive fixing of the protective cap consists in arranging the protective cap to engage behind the nut. To make available a sufficiently large space (undercut) for this purpose, an embodiment is preferred in which an annular groove is formed in the contact face, preferably an end face, which annular groove extends radially inwards from radially outside the nut to a region in which the annular groove is located axially adjacent to, that is below, the nut. A fixing portion (locking portion) of the protective cap then engages in this region located axially below the nut. For assembly purposes, the protective cap may be pressed on over the nut in the axial direction and clipped into the undercut. For additional sealing, a flexible sealing lip is formed on the protective cap at a radial distance from the undercut, with which sealing lip the protective cap bears sealingly against the contact disk and/or the vehicle body and/or a rear window. An especially great advantage of the form-fitting solution described is that separate components for producing the positive connection to the rest of the windshield wiper drive can be dispensed with.

Especially if engagement of the protective cap in an annular groove of the contact disk, as described previously, is to be dispensed with, an embodiment is preferred in which the protective cap is positively retained by a fastening component which is clamped between the nut and the contact disk. Such a fastening part is preferably an, especially annular, sheet metal bent part. During assembly the protective cap is fitted over the external diameter of the fastening part and the fastening part is sealed relative to the contact disk by the establishment of a press fit between the fastening component and the contact disk.

To further improve the seal quality, a continuous flexible sealing edge (sealing lip) may be provided on a contact surface of the elastomer protective cap, with which the protective cap bears sealingly against the contact disk and/or the vehicle body and/or a rear window. By suitable shaping of the protective cap it can be ensured that the sealing edge folds outwardly in the radial direction during assembly, in order to be able to establish optimum sealing conditions.

The invention also specifies a motor vehicle with a windshield wiper drive as described previously. The windshield wiper drive is preferably a motor vehicle rear window wiper drive. In this case the output dome of the housing of the windshield wiper drive, which preferably is a transmission housing of the windshield wiper drive, passes through an opening in the vehicle body or in the rear window, the windshield wiper drive being tensioned in the direction of the rear window or the vehicle body by the nut screwed onto the external thread of the output dome. In this case it is possible to implement an embodiment in which the housing is supported directly on the rear window or the vehicle body from the direction of the interior of the motor vehicle, or via a support flange fitted to the output dome.

Especially advantageous is an embodiment of the motor vehicle in which the protective cap, formed from an elastomer, preferably with at least one sealing lip, bears sealingly against the vehicle body and/or the rear window additionally or alternatively to a sealing abutment against the contact disk.

BRIEF DESCRIPTION OF THE DRAWINGS

Further advantages, features and details of the invention are apparent from the following description of preferred exemplary embodiments and from the drawings, in which:

FIG. 1a is an incomplete representation of a windshield wiper drive fastened to a rear window;

FIG. 1b is an enlargement of a detail from FIG. 1a showing an integrally molded sealing lip with which a protective cap of the windshield wiper drive bears sealingly against a contact disk;

FIG. 2 shows an alternative exemplary embodiment of a windshield wiper drive fastened to a rear window of a motor vehicle in which the protective cap engages form-fittingly behind an undercut formed on a fastening nut, an alternative embodiment being indicated by broken lines.

DETAILED DESCRIPTION

Figure 3:
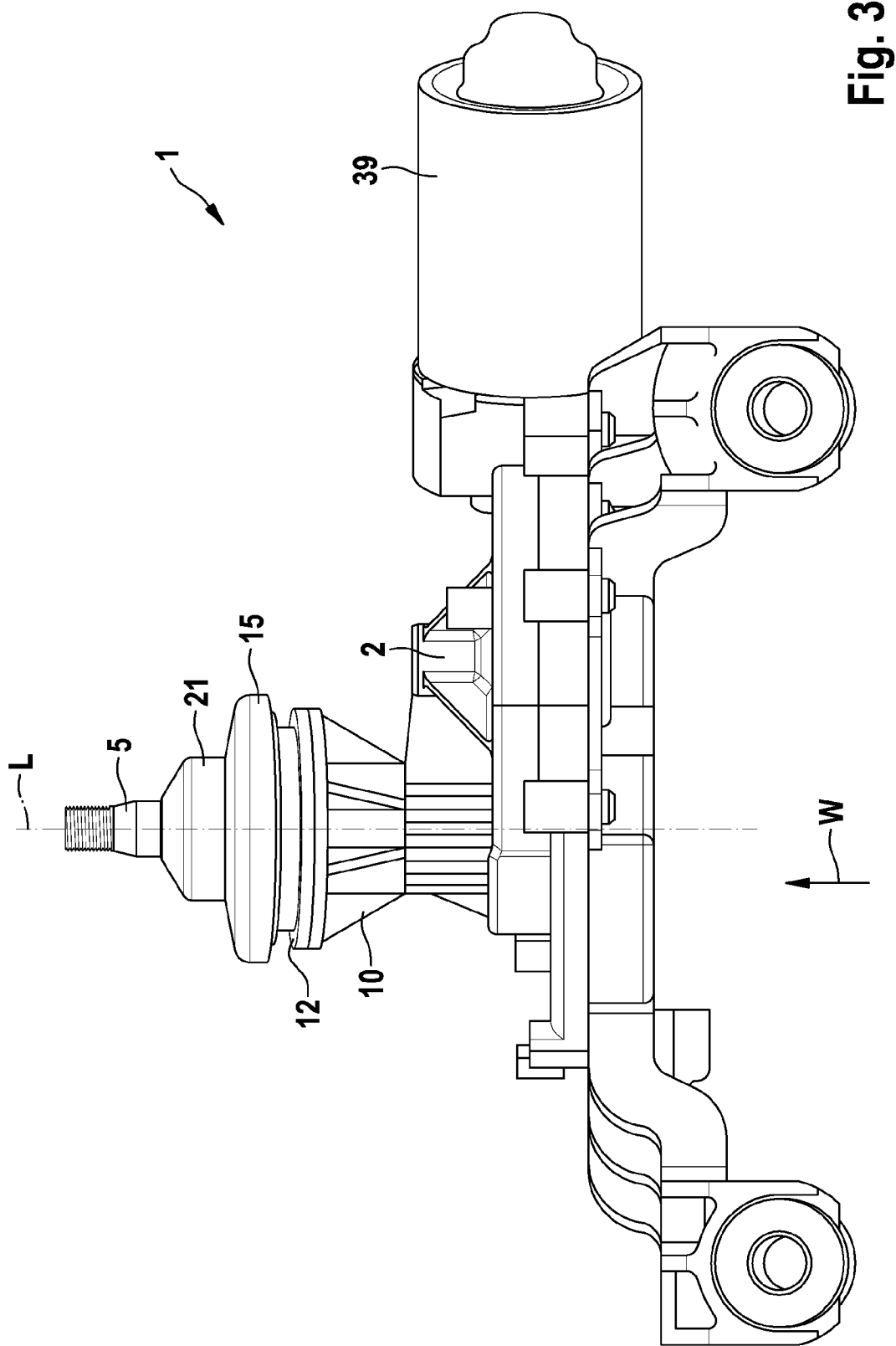
FIG. 3 is a complete representation of a windshield wiper drive and an elastomer protective cap.

In the figures identical components and components having the same function are denoted by the same reference numerals.

FIG. 1a shows a section of a windshield wiper drive 1 in the form of a rear window wiper drive. The windshield wiper drive 1 may be embodied as shown in FIG. 3. It comprises a housing 2 with an integrally formed output dome 3 which has a central through-opening 4. A transmission, preferably in the form of a worm gear, is accommodated in known fashion within the housing 2, only the output dome 3 of which is represented in FIG. 1, which transmission is driven by an electric motor. A wiper shaft 5, which passes through the through-opening 4 of the output dome 3 in the axial direction, is driven in an oscillatory fashion about its longitudinal central axis L by means of the drive motor (not shown) and the transmission (also not shown).

A wiper arm 6, which moves across a rear window 7 when the wiper shaft 5 is driven oscillatingly, is fastened non-rotatably to an end of the wiper shaft 5.

A receiving opening 8, through which the output dome 3 of the housing 2 passes in the axial direction, is provided in the rear window 7. A support flange 10, fitted to the output dome 3 which tapers in the direction of its free end 18, is located on a side of the rear window 7 oriented towards the interior 9 of the motor vehicle. By means of the support flange 10, the housing 2 is supported in the axial direction against an annular seal 11 which is arranged to extend around the inner circumference 8. For this purpose the support flange 10 has an annular support surface 12 which is arranged on a circumferential collar 13 of the support flange 10. In an alternative embodiment (not shown), the support flange 10 is formed integrally with the output dome 3. The support flange 10 passes through the receiving opening 8 in the axial direction coaxially with the output dome 3.

A contact disk 15 made of plastics material, which bears axially, with a contact surface 16 on its end face, against the annular seal 11, is located on a side of the rear window 7 oriented towards the environment 14 of the motor vehicle. A circumferential edge 17 of the contact disk 15 extends around the annular seal 11 in the axial direction. The contact disk 15 is in turn penetrated in the axial direction by the output dome 3, which is provided with an external thread 19 in the region of its free end 18. A nut 20, with which the contact disk 15 is tensioned against the annular seal 11, is screwed onto this external thread 19 from the outside, while at the same time the output dome 3 presses the support flange 10 against the annular seal 11 in the axial direction away from the interior 9 of the motor vehicle. A defined sealing pressure is thereby applied to the annular seal 11, whereby the latter bears radially inwardly in a sealing fashion against the outer periphery of the support flange 10.

A protective cap 21 made of an elastomeric material is arranged in a region between the wiper arm 6 and the contact disk 15. In this case the wiper shaft 5 passes through a central opening 22 of the protective cap 21 in the axial direction. In the region of the opening 22 the protective cap 21 bears with two axially spaced sealing lips 23, 24, which project inwardly in the radial direction, against the outer circumference of the wiper shaft 5. A grease chamber 25 filled with lubricating grease is formed between the sealing lips 23, 24, the grease repository minimizing the friction between the sealing lips 23, 24 and the wiper shaft 5 while at the same time optimizing the sealing effect. The protective cap 21 extends in the axial direction as far as the contact disk 15, on which it is supported in the axial direction by means of a continuous flexible sealing lip 26, shown in FIG. 1b, and thus bears sealingly against the contact disk 15. A fastening part 27 in the form of an annular sheet metal bent part, which is clamped axially between the nut 20 and the contact disk 15 by means of a radially inner section, is provided to secure the protective cap 21 against unwanted axial displacement. A radially outer circumferential shoulder 28 of the annular fastening part 27 forms an undercut 29, behind which a radially inwardly oriented fixing portion 30 of the protective cap 21 engages. Expressed differently, the fixing portion 30 of the protective cap 21 projects into a region axially between the fastening part 27 and the contact disk 15.

As can further be seen from FIG. 1a, an annular seal 31 is arranged in a region radially between the inner circumference of the output dome 3 in the through-opening 4 and the outer circumference of the wiper shaft 5. The annular seal 31 is enclosed in the manner of a sandwich between a plastics retaining ring 32, which is arranged axially above it in the drawing plane and is pressed into the annular chamber formed between the output dome 3 and the wiper shaft 5, and a bearing bush 33 which is arranged axially below said annular seal 31 for rotary support of the wiper shaft 5.

FIG. 2 shows an alternative embodiment of a windshield wiper drive 1. The structure and operation thereof correspond substantially to the structure described previously and shown in FIG. 1a. To avoid repetition, the following discussion relates essentially only to the differences from the exemplary embodiment described previously. With regard to common features, reference is made to FIG. 1a and FIG. 1b, and to the preceding description of the figures.

In the exemplary embodiment according to FIG. 2, illustration of the wiper shaft 5 has been omitted. Only the through-opening 4 within the output dome 3 can be seen.

In the exemplary embodiment according to FIG. 2, a separate fastening part for positive attachment of the protective cap 21 has been dispensed with. Instead, an annular groove 35, which extends inwardly in the radial direction as far as a region axially below the nut 20, is formed in an end face 34 of the contact disk 15 oriented towards the protective cap 21. In this way an undercut 36, behind which engages a radially inwardly projecting fixing portion 30 of the protective cap 21 made of an elastomeric material, is formed on the nut 20. Expressed differently, the fixing portion 30 of the protective cap 21 projects inwardly in the radial direction into a region axially between the nut 20 and the contact disk 15.

The protective cap 21 bears sealingly against the contact disk 15 via a sealing portion 37 arranged radially outside the fixing portion 30, on which sealing portion 37 a sealing lip shown in FIG. 1b may be integrally molded if needed.

Additionally or alternatively, the protective cap 21 may bear sealingly with a sealing portion 38, optionally with a sealing lip, against the rear window 7, as is shown by broken lines in the left-hand half of the drawing. The component designated by reference numeral 7 may alternatively be the vehicle body.

A complete view of a windshield wiper drive 1 is shown in FIG. 3. The housing 2 in the form of a transmission housing, to which a pole housing 39 of an electric drive motor is flange-connected, can be seen. Also to be seen is the support flange 10, which is fitted over the concealed output dome and is arranged axially at a distance from the contact disk 15, either a rear window or a rear part of a vehicle body being located between the contact disk 15 and the support face 12 of the support flange 10 in the assembled state.

The protective cap 21 made of an elastomeric material is arranged axially adjacent to, that is, above the contact disk 15, which protective cap 21 bears sealingly against the contact disk 15 on one side and against the wiper shaft 5 on the other, the wiper shaft 5 rotating relative to the fixed protective cap 21 during operation of the windshield wiper drive 1.

The invention claimed is:

1. A windshield wiper drive, comprising a housing (2) with an output dome (3) penetrated by a wiper shaft (5) and penetrating a contact disk (15), which output dome (3) has in a region of its free end (18) an external thread (19) onto which a nut (20) for tensioning the contact disk (15) is screwed within a protective cap (21) penetrated by the wiper shaft (5), characterized in that the protective cap (21) is formed from an elastomeric material, wherein the contact disk defines a planar end face oriented toward the protective cap and the nut, and wherein the protective cap bears sealingly against the planar end face of the contact disk.

2. The windshield wiper drive as claimed in claim 1, characterized in that the protective cap (21) bears sealingly against the wiper shaft (5).

3. The windshield wiper drive as claimed in claim 1, characterized in that a grease chamber (25) is formed radially between the protective cap (21) and the wiper shaft (5).

4. The windshield wiper drive as claimed in claim 1, characterized in that the protective cap (21) is retained positively in its installed position.

5. The windshield wiper drive as claimed in claim 1, characterized in that the end face of the contact disk has therein an annular groove (35) which extends inwardly in a radial direction as far as a region axially below the nut (20) in such a manner that an undercut (36) behind which the protective cap (21) engages is formed axially between the nut (20) and the contact disk (15).

6. The windshield wiper drive as claimed in claim 1, characterized in that the protective cap (21) is retained positively on a fastening part (27), and in that the fastening part (27) is received in a clamped manner between the nut (20) and the contact disk (15).

7. The windshield wiper drive as claimed in claim 6, characterized in that the fastening part (27) is a sheet metal bent part.

8. The windshield wiper drive as claimed in claim 1, characterized in that a grease chamber (25), which is delimited axially by at least two sealing lips (23, 24), is formed radially between the protective cap (21) and the wiper shaft (5).

9. The windshield wiper drive as claimed in claim 1, characterized in that the protective cap (21) bears sealingly against the contact disk (15), by means of at least one sealing lip (26).

10. The windshield wiper drive as claimed in claim 1, characterized in that the protective cap (21) is retained positively on a fastening part (27), in an undercut (29), and in that the fastening part (27) is received in a clamped manner between the nut (20) and the contact disk (15).

11. A motor vehicle with a windshield wiper drive (1), comprising a housing (2) with an output dome (3) penetrated by a wiper shaft (5) and penetrating a contact disk (15), which output dome (3) has in a region of its free end (18) an external thread (19) onto which a nut (20) for tensioning the contact disk (15) is screwed within a protective cap (21) penetrated by the wiper shaft (5), characterized in that the protective cap (21) is formed from an elastomeric material, the output dome (3) being arranged to pass through a vehicle body or a rear window (7), wherein the contact disk defines a planar end face oriented toward the protective cap and the nut, and wherein the protective cap bears sealingly against the planar end face of the contact disk.

12. The motor vehicle as claimed in claim 11, characterized in that the protective cap (21) bears sealingly against the vehicle body and/or the rear window (7).

13. A motor vehicle as claimed in claim 11, wherein the motor vehicle has a rear window, and wherein the output dome (3) passes through the rear window.

14. The motor vehicle as claimed in claim 13, characterized in that the protective cap (21) bears sealingly against the rear window (7), by means of at least one sealing lip.

15. The motor vehicle as claimed in claim 14, characterized in that the protective cap (21) bears sealingly against the wiper shaft (5).

16. The motor vehicle as claimed in claim 15, characterized in that a grease chamber (25) is formed radially between the protective cap (21) and the wiper shaft (5).

17. The motor vehicle as claimed in claim 16, characterized in that the protective cap (21) is retained positively in its installed position.

18. The motor vehicle as claimed in claim 17, characterized in that the end face of the contact disk has therein an annular groove (35) which extends inwardly in a radial direction as far as a region axially below the nut (20) in such a manner that an undercut (36) behind which the protective cap (21) engages is formed axially between the nut (20) and the contact disk (15).

19. A windshield wiper drive, comprising a housing (2) with an output dome (3) penetrated by a wiper shaft (5) and penetrating a contact disk (15), which output dome (3) has in a region of its free end (18) an external thread (19) onto which a nut (20) for tensioning the contact disk (15) is screwed within a protective cap (21) penetrated by the wiper shaft (5), characterized in that the protective cap (21) is formed from an elastomeric material, wherein the protective cap (21) is retained positively on a fastening part (27), in an undercut (29), and the fastening part (27) is received in a clamped manner between the nut (20) and the contact disk (15).

* * * * *

UNITED STATES PATENT AND TRADEMARK OFFICE
CERTIFICATE OF CORRECTION

PATENT NO. : 8,590,097 B2  Page 1 of 1
APPLICATION NO. : 12/993476
DATED : November 26, 2013
INVENTOR(S) : Bohn et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 334 days.

Signed and Sealed this
Twenty-second Day of September, 2015

Michelle K. Lee
*Director of the United States Patent and Trademark Office*